United States Patent [19]

McMillan

[11] 3,868,005
[45] Feb. 25, 1975

[54] FRICTION CLUTCH WITH CENTRIFUGAL AND MAGNETIC SPEED CONTROL

[75] Inventor: Stephen L. McMillan, Louisville, Ky.

[73] Assignee: General Electric Company, Louisville, Ky.

[22] Filed: Mar. 14, 1973

[21] Appl. No.: 341,029

[52] U.S. Cl. ............................. 192/105 CS, 192/35
[51] Int. Cl. .............................................. F16d 43/06
[58] Field of Search ........ 192/103 A, 104 R, 105 B, 192/105 C, 105 CP, 105 CS, 35

[56] References Cited
UNITED STATES PATENTS

| | | | |
|---|---|---|---|
| 2,564,841 | 8/1951 | Gravina | 192/35 X |
| 2,907,433 | 10/1959 | Maurice | 192/104 R X |
| 3,184,025 | 5/1965 | Aschaver | 192/105 B |
| 3,269,499 | 8/1966 | Shelton | 192/104 R X |
| 3,463,285 | 8/1969 | Sisler | 192/104 R |
| 3,483,719 | 12/1969 | Heidmann | 192/84 R X |

Primary Examiner—Benjamin W. Wyche

[57] ABSTRACT

A friction clutch including centrifugal and electromagnetic speed control systems. The clutch consists of an output member rotatably mounted on the drive member, an input member mounted for rotation with the drive member and centrifugal speed sensitive elements mounted on a carrier plate, and arranged to move the input member into frictional engagement with the output member. An electromagnetic coil located below the carrier plate and spaced therefrom provides a flux through the carrier plate which results in eddy currents in the plate and a magnetic drag on the plate. This drag can be varied by the degree of energization of the coil. The speed of the carrier plate controls the amount of pressure or thrust that the centrifugal speed sensing elements apply to the input member to control the clutch torque applied to the output member.

3 Claims, 1 Drawing Figure

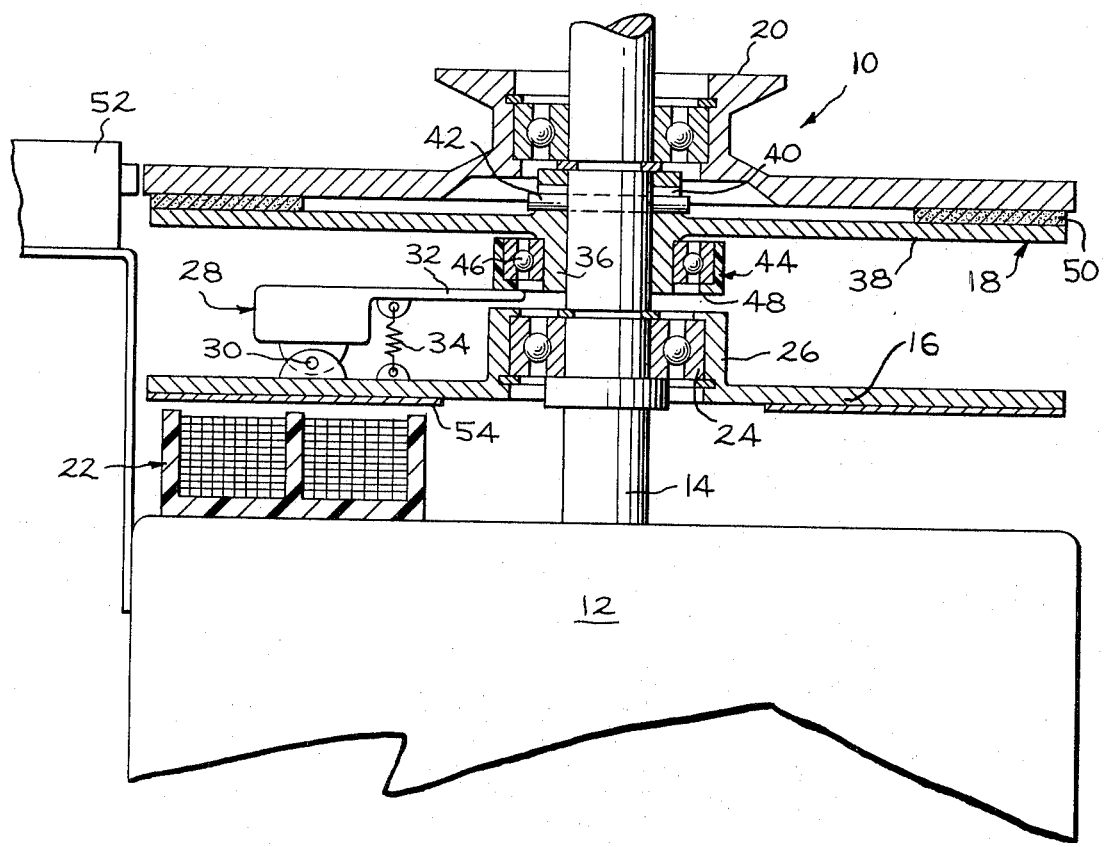

FRICTION CLUTCH WITH CENTRIFUGAL AND MAGNETIC SPEED CONTROL

BACKGROUND OF THE INVENTION

The present invention relates to improved friction clutch with centrifugal and magnetic speed control for use in automatic washing machines. Drive systems of appliances, such as automatic washing machines, incorporate clutches which enable the user to operate the appliance at a wide selection of operating speeds to suit various types of fabric loads. The use of electromagnetic clutches with washing machines provides efficient reliability and low cost means for enabling the user to have a very wide selection of operating speeds. That type of prior art drive control assembly for use in washing machines having an electric clutch with speed control is disclosed in U.S. Pat. No. 3,463,285 - R. R. Sisler, assigned to General Electric Company, the assignee of this invention. In the electric clutch with speed control disclosed in the Sisler patent, a rotary clutch input structure is driven by a centrifugally operated clutch including shoes driven by the motor shaft which engage the input structure. The input structure includes actuating coil which when energized attracts the clutching member of the output structure to engage the input and output structure through friction that is to drive the output member. With the input structure rotating, it is necessary to energize the actuating coils through slip rings. The frictional material as used in the prior art between the input and output structure of the friction clutch wear and as a result vary the air gap between the carrier plate and the electromagnetic coil so that the magnetic force applied to the carrier plate varies as the frictional material wears and the air gap is increased. U.S. Pat. No. 3,582,697 to J. Bochan, assigned to the assignee of this invention, discloses a combination motor and friction clutch assembly which is electromagnetically operated, and the actuating coil is permanently mounted on the motor. The output member of the friction clutch is brought into operative engagement with the input member by energizing the coil. With this arrangement maximum energization of the coil results in maximum output speed of the clutch. In U.S. Pat. No. 3,662,197 to J. C. Worst and assigned to the assignee of the present invention, the structure arrangement is such that maximum torque or speed is transmitted when the electromagnetic coil is de-energized, with minimum torque being transmitted when the coil is energized. In the electromagnetically operated friction clutch of the Worst patent the air gap is determined by the thickness of the friction material, and thereby the air gap varies as the frictional material wears due to use.

SUMMARY OF THE INVENTION

In accordance with this invention, there is provided a friction clutch assembly for use particularly in automatic washing machines, including a rotatable drive shaft, an input member mounted for rotation with the shaft, an output member mounted for rotation, with the input and output members arranged so that one of them may axially move to engage and disengage the other. To provide means for causing this axial movement there is a plate mounted around the shaft for rotation relative to the shaft and a speed responsive means, such as a pivotal weighted centrifugal force responsive element mounted on the carrier plate, which speed responsive means causes force to be exerted against the axially movable member to move that member relative to the other member for engagement and disengagement therewith. Means are also provided for altering the speed at which the plate rotates relative to the shaft thereby varying the force the speed responsive means causes to be exerted against the axially movable member and thereby control the resultant clutch torque between the input and output members.

The rotational speed of the carrier plate is controlled by the eddy currents generated by the magnetic coil and the drag they effect on the plate. This drag is varied by the degree of energization of the coil and thereby controls the amount of clutch torque the centrifugally responsive weights cause between the input and output members.

By this clutch assembly, the rotational speed of the plate may be easily controlled by varying only a small amount of force applied to the plate which in turn is amplified through the cooperating clutch assembly members to exert control over the clutch torque between the input and output members.

It is an object of this invention to provide a new and improved clutch assembly.

It is a further object of this invention to provide a new and improved clutch assembly that controls the clutch torque between an input and output member by varying a small amount of force which in turn is amplified through cooperation of the clutch assembly members.

It is another object of this invention to provide a clutch assembly wherein the clutch torque is controlled between the input and output members by varying a small amount of force affected by an eddy current coupling, which force is amplified through cooperation of the clutch assembly members.

BRIEF DESCRIPTION OF THE DRAWING

The single FIGURE is a sectional view of a motor driven clutch mechanism embodying the present invention.

BRIEF DESCRIPTION OF THE EMBODIMENT

Referring now to the drawing, there is illustrated the new and improved electro-mechanical clutch generally indicated by numeral 10 and a motor 12. The clutch 10 is positioned around the motor shaft 14 and includes a carrier plate or dish 16 rotatably mounted on the shaft so that it may rotate with respect thereto, an input member 18 driven from said shaft 14 and arranged for axial movement thereon, an output member 20 mounted around the shaft 14 and rotatable relative thereto, and an electromagnetic clutch coil 22 mounted on the motor 12. The carrier plate 16 is rotatably supported from the shaft 14 by a ball bearing assembly 24 whose inner surface engages the shaft 14 so that the carrier plate can rotate relative to it. The carrier plate 16 is formed with a cylindrical portion or hub 26 whose inner surface engages the outer race of the bearing assembly 24. In operation the friction of the ball bearing 24 is such that when the shaft 14 is rotated by the motor 12, the carrier plate 16 will also be rotated and gradually come up to motor speed. Pivotally mounted on the carrier plate 16 for rotation therewith is a centrifugally responsive or speed sensitive member or weight 28. The weight 28 is so mounted on its pivot 30 that, as carrier plate 16 is rotated, the weight tends to rotate in a counter-clockwise direction about its pivot due to centrifugal force applied thereto. The weight is provided with a radially inwardly extending arm 30. This rotation of the weight 28 is in part opposed by a spring 34 located between the arm 32 and the plate 16. While only one weight 28 is shown, any number of weights may be utilized and preferably spaced equally around the circumference of the carrier plate 16. Input member 18 includes a sleeve or hub portion 36 mounted on the shaft 14, and an outwardly extending disc portion 38. The sleeve 36 is provided with a pair of diametrically disposed axially elongated slots 40. A pin 42 extends through the shaft 14 with its free ends arranged in the slots 40. It will be noted that with this arrangement the input member 18 is driven by the shaft 14 while the pin 42 and slot 40 arrangement allows input member 18 to move in an axial direction on the shaft 14 with respect to the output member 20. Mounted on the lower portion of the hub 36 of the input member 18 and arranged for rotation relative to the input member 18 is a bearing ring 44. The ring 44 is mounted to the out surface of the sleeve 36 by a bearing 46. The bearing ring 44 has an annular portion 48 extending below the lower surface of bearing 46 so located to be engaged by the free end of the arm 32 of member 28. Adhesively secured to the upper surface or face of the portion 38 of input member 18 and adjacent its peripheral edge is a ring of friction material 50 which, as will hereinafter be described, engages the undersurface of the output member 20. In operation the mechanical portion of the clutch 10 operates in the following manner. As motor 12 attains its operating speed, the shaft 14 through bearing 24 drives the carrier plate 16 at motor speed. With the acceleration of carrier plate 16 to motor speed due to the frictional torque transmitted through the bearing assembly 24 the weight 28 rotates counterclockwise due to the centrifugal force applied thereto. This counterclockwise rotation of the weight 28 causes the arm 32 to engage the portion 48 of the ring 44. The engagement of arm 32 with the ring 44 causes the input member 18 to move axially into engagement with the output member 20 thereby rotating the output member 20 up to motor speed. As can be readily understood, the torque between the member 18 and 20 is in effect controlled by the force applied by the arm 32 to ring 44. Since the force applied by member 28 is a function of its centrifugal force on member 44 it will be understood that the speed of rotation of carrier plate 16 determines the torque transmitted between member 18 and 20.

In accordance with one embodiment of the present invention, means are provided through coil 22 for varying the speed of the output member 20 by controlling the speed of carrier plate 16. In order to regulate the torque transmitted by the clutch drive shaft 14 to the output member 18, an appropriate control circuit including an output speed sensor 52 may be used to connect the coil 22 to a source of electrical energy. While suitable speed sensing devices are set forth in the aforementioned U.S. Pats. Nos. 3,582,697 and 3,662,197, reference is also made to U.S. Pat. No. 3,483,719 to D. S. Heidtman and assigned to General Electric Company, the assignee of the present invention, for description of a control circuit adapted to control a clutch of the type described herein. Secured to the bottom face of the carrier plate 16 is an angular disc 54 formed of ann electrically conducting material such as copper. The disc 54 is arranged to be spaced from the stationary coil 22 to provide the proper air gap between the coil 22 and the disc 54, so that by energizing the coil 22 an eddy current is created through the disc 54 to place a magnetic drag on the carrier plate 16 so as to reduce the speed of the carrier plate relative to the rotational speed of the motor shaft 14.

As was previously mentioned, the system of the present invention is adapted for use in automatic clothes washers and other such appliances where it is desirable to provide a combination motor clutch assembly having clutch input and output members that are normally biased into a driving engagement whereby no electric current need by supplied to the electromagnetic clutch in order for the clutch to drive the appliance at full speed. It should now be apparent that the present invention provides such a combination of a clutch assembly which is simple and inexpensive in design and highly reliable in operation. Further, where the signal requirements to the coil assembly 22 need only be those to induce appropriate eddy currents into the carrier plate 16, and as compared to the prior art clutches where the signal had to be sufficient to provide an electromagnetic force great enough to cause engagement of the clutch, the output requirements of the control curcuit such as set forth in U.S. Pat. No. 3,483,719 set forth above are considerably reduced.

With the use of the centrifugal responsive members 28 of the present embodiment there is in effect provided a force amplification which is capable of controlling the speed of the output member 20 by an initial relatively small force applied to the carrier plate 16. It should be apparent that while in the embodiment shown and described herein the speed of the carrier plate is varied by eddy current generated by the coil 22, the speed of the carrier plate 16 could be varied by other means for example, a relatively small electromagnetically actuated friction drag applied to the carrier plate 16.

While in the preferred embodiment shown, input member 18 is movable axially relative to output member 20 for engagement therewith, the present invention could be adapted wherein the output member 20 would be movable axially relative to the input member.

As it should be apparent to those skilled in the art, that while what has been described is considered at the present to be the preferred embodiment of this invention, in accordance with the Patent Statutes, changes may be made in the disclosed friction clutch with centrifugal and magnetic speed control without actually departing from the true spirit and scope of this invention.

I claim:

1. An electro-mechanical clutch mechanism comprising:
   an electric motor having a rotatable shaft;
   a carrier plate mounted in a fixed axial location around said shaft for rotation relative thereto;
   an output member mounted around said shaft for rotation relative thereto;
   an input member mounted for rotation with said shaft and arranged for movement axially on said shaft for engagement with said output member;
   centrifugal responsive means mounted on said carrier plate to axially move one of said members relative to the other of said member as said carrier plate accelerates to motor speed;

electromagnetic coil means spaced from said carrier plate to form an air gap so that said electromagnetic coil induces an eddy current in said carrier plate, for altering the speed at which said carrier plate rotates relative to said shaft and thereby controlling the movement of the centrifugal responsive means and the resultant clutch torque between said input and output members.

2. The invention as set forth in claim 1 wherein the centrifugal responsive means axially move said input member into engagement with said output member as said carrier plate accelerates to motor speed.

3. An electro-mechanical clutch mechanism comprising:

an electric motor having a rotatable shaft;

a carrier plate mounted around said shaft for rotation relative thereto;

an output member mounted around said shaft for rotation relative thereto;

an input member located on said shaft between said carrier plate and said output member being mounted for rotation with said shaft and arranged for movement axially on said shaft for engagement with said output member;

centrifugal responsive means mounted on said carrier plate to axially move said input member into engagement with said output member for driving said output member as said carrier plate accelerates to motor speed;

electromagnetic coil means mounted on said motor below the carrier plate and spaced therefrom to form an air gap for inducing an eddy current in said carrier plate when said coil is energized;

means responsive to the rotational speed of said output member for controlling the output of said coil means to vary the eddy current induced in said carrier plate for altering the speed at which said carrier plate slips relative to said motor shaft to control the axial force said centrifugal responsive means applies to said input member and the resultant clutch torque between said input and output members.

* * * * *